(12) United States Patent
Clayton

(10) Patent No.: US 7,419,054 B1
(45) Date of Patent: Sep. 2, 2008

(54) CD CASE WITH GUITAR PICK DISPLAY CAPABILITY

(76) Inventor: Steve Clayton, 201 Rogue River Hwy., Talent, OR (US) 97520

( * ) Notice: Subject to any disclaimer, the term of this patent is extended or adjusted under 35 U.S.C. 154(b) by 357 days.

(21) Appl. No.: 11/183,373

(22) Filed: Jul. 18, 2005

(51) Int. Cl.
B65D 85/57 (2006.01)

(52) U.S. Cl. ............... 206/232; 206/308.1; 84/322

(58) Field of Classification Search ........... 206/216, 206/223, 38, 307.1, 308.1, 309, 310; 84/320, 84/322; 53/443, 467, 473, 474
See application file for complete search history.

(56) References Cited

U.S. PATENT DOCUMENTS

| | | | |
|---|---|---|---|
| 5,915,550 A * | 6/1999 | Gartz | 206/308.1 |
| 6,288,996 B1 | 9/2001 | Siegel | |
| 6,409,014 B1 | 6/2002 | Hummell et al. | |
| 6,530,474 B1 * | 3/2003 | Rufo et al. | 206/308.1 |
| 6,547,201 B2 | 4/2003 | Barich et al. | |
| 6,581,766 B2 | 6/2003 | Hui | |
| 2004/0144662 A1 * | 7/2004 | Bolognia et al. | 206/308.1 |
| 2007/0006713 A1 * | 1/2007 | Dunlop | 84/322 |

OTHER PUBLICATIONS www.tinytreasures.com/level_2/inserts/guitar/guitar.htm; Guitar Pick Displays; two pages; copyright 2004.*
www.vai.com/allaboutsteve/discography/discogrphy_solo.html; release date Dec. 11, 2001, "The Secret Jewel Box"; two pages.*

* cited by examiner

*Primary Examiner*—Luan K Bui
(74) *Attorney, Agent, or Firm*—Gerald D. Haynes; R. Keith Harrison

(57) ABSTRACT

A CD case with guitar pick display capability is disclosed. The CD case includes a first cover and a second cover attached to the first cover. A tray is provided on the first cover, and at least one guitar pick cavity is provided in the tray for holding and displaying at least one guitar pick through the case. A method of packaging a compact disk is also disclosed.

14 Claims, 2 Drawing Sheets

CD CASE WITH GUITAR PICK DISPLAY CAPABILITY

FIELD OF THE INVENTION

The present invention relates to CD (compact disk) cases for the packaging and/or storage of compact disks. More particularly, the present invention relates to a CD case which is capable of containing and displaying a compact disk and one or multiple guitar picks for packaging, marketing and/or storage purposes.

BACKGROUND OF THE INVENTION

A conventional CD (compact disk) case, also known as a "jewel case", typically includes a base and a lid which is pivotally attached to the base. A tray provided in the base includes a circular depression which receives a compact disk. A projection or tab typically extends from the center of the depression and snaps into an opening extending through the middle of the compact disk to detachably snap-fit the compact disk in the depression. The lid is pivoted shut on the base to enclose the compact disk in the case.

In those jewel cases which are adapted to hold two compact disks, a depression is typically provided in both surfaces of the tray for holding the respective compact disks. The tray is pivotally attached to the base to render accessible the depressions on the respective surfaces of the tray. Compact disks of all varieties are packaged in CD jewel cases, including those which hold music recorded by popular musical artists as well as those which are used to train persons in guitar playing methods.

Guitar picks are thin, flat pieces of plastic or wood which are used to strum the strings of an acoustic or electric guitar during guitar play and are frequently used by beginners of guitar playing as well as by experienced players. Typically, guitar picks are packaged in large counter displays, clamshells and/or poly bags with header cards and are sold separately from compact disks used to teach guitar playing methods.

What is needed is a CD case which is capable of containing and displaying a compact disk as well as one or multiple guitar picks for packaging, marketing and/or storage purposes. Such a CD case would enhance the marketability of guitar training CDs, for example, by offering one or an assortment of guitar picks along with the guitar training CD.

SUMMARY OF THE INVENTION

The present invention is generally directed to a CD case with guitar pick display capability. The CD case includes a first cover and a second cover which is attached to the first cover. A tray is provided on the first cover. At least one guitar pick cavity is provided in the tray for holding and displaying at least one guitar pick through the case.

The present invention is further directed to a method of packaging a compact disk. The method includes providing a CD case having a first cover and a tray and a second cover attached to the first cover, providing a compact disk and at least one guitar pick on the tray and displaying the compact disk and the at least one guitar pick through the CD case.

BRIEF DESCRIPTION OF THE DRAWINGS

The invention will now be described, by way of example, with reference to the accompanying drawings, in which.

DETAILED DESCRIPTION OF THE INVENTION

Figure 1:
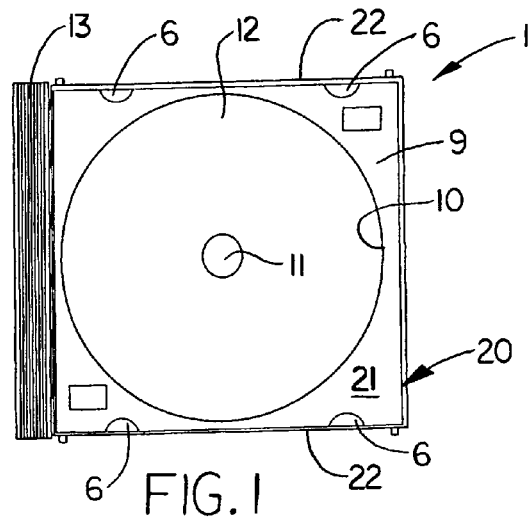
FIG. 1 is a top view of an illustrative embodiment of the CD case with guitar picks according to the present invention, with the CD case with guitar picks in the closed position, more particularly illustrating a CD depression for holding a compact disk (not illustrated) visible through the lid of the CD case.
Figure 2:
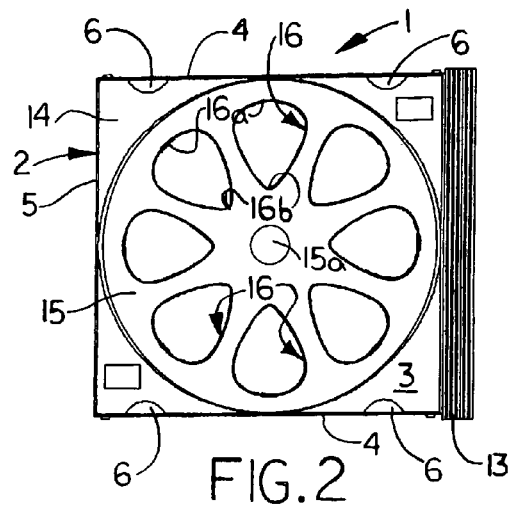
FIG. 2 is a bottom view of an illustrative embodiment of the CD case with guitar picks according to the present invention, with the CD case with guitar picks in the closed position, more particularly illustrating multiple guitar pick cavities for holding respective guitar picks (not illustrated) visible through the base of the CD case.
Figure 3:
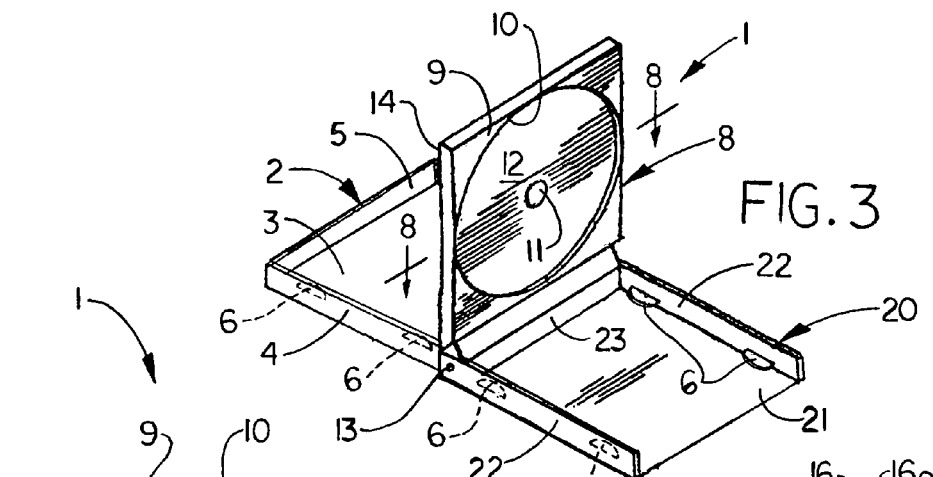
FIG. 3 is a perspective view of the CD case with guitar picks, with the lid pivoted to the open position on the base and the tray component of the CD case shown in a generally vertical position.

Referring initially to FIGS. 1-5 of the drawings, an illustrative embodiment of the CD case with guitar picks, hereinafter CD case, of the present invention is generally indicated by reference numeral 1. As illustrated in FIG. 3, the CD case 1 includes a bottom cover 2 which is typically transparent plastic and has a generally rectangular bottom cover panel 3, side walls 4 and a rear wall 5 which spans the side walls 4. A pair of spaced-apart insert tabs 6 may extend from the inner surfaces of the respective side walls 4 to retain an insert label (not illustrated) in the bottom cover 2 for display through the bottom cover panel 3, as is known by those skilled in the art.

Figure 4:
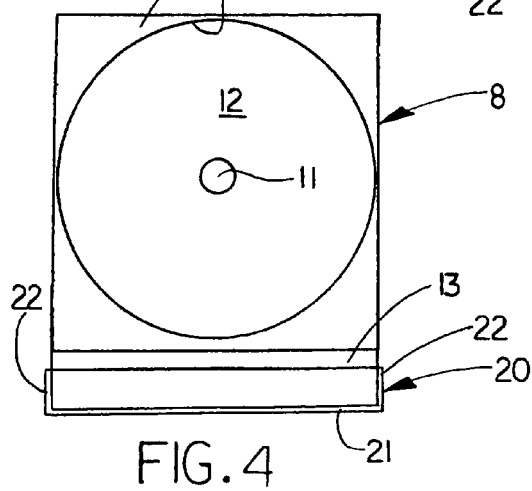
FIG. 4 is a front view of the opened CD case illustrated in FIG. 3, illustrating a compact disk depression provided in the upper surface of the tray.

A tray 8, which is typically plastic, is pivotally attached to the bottom cover 2 at a hinge 13. The tray 8 has an upper surface 9 and a lower surface 14. As illustrated in FIGS. 1, 3 and 4, a generally circular CD depression 10 may be provided in the upper surface 9 of the tray 8. A CD support surface 12 is provided at the bottom of the CD depression 10. A CD attachment tab 11 extends from the CD support surface 12, at substantially the center of the CD depression 10. Accordingly, the CD depression 10 is sized and configured to receive and hold a standard compact disk 26 (FIG. 6) in the tray 8 as the CD attachment tab 11 is inserted through a central opening 27 in the compact disk 26, typically in conventional fashion as will be hereinafter further described. However, it will be understood that the tray 8 may be provided with any attachment mechanism which is known by those skilled in the art and is suitable for detachably mounting the compact disk 26 on the tray 8. This may include embodiments in which the CD depression 10 is omitted.

Figure 5:
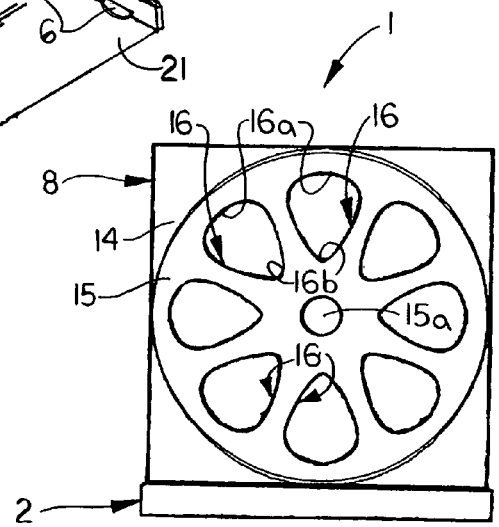
FIG. 5 is a rear view of the opened CD case illustrated in FIG. 3, illustrating multiple guitar pick cavities provided in the lower surface of the tray.

As illustrated in FIGS. 2 and 5, a CD support surface elevation 15, which corresponds to the bottom of the CD depression 10 provided in the upper surface 9 of the tray 8, may extend from the plane of the lower surface 14 of the tray 8. As illustrated in FIG. 8, at least one, and preferably, multiple guitar pick cavities 16 extend into the CD support surface elevation 15. Alternatively, the guitar pick cavities 16 may extend directly into the lower surface 14 of the tray 8, such as in embodiments in which the CD depression 10 is omitted from the upper surface 9 of the tray 8 and replaced by an alternative CD attachment mechanism. The guitar pick cavities 16 may be molded, vacuum-formed or otherwise provided in the tray 8 according to the knowledge of those skilled in the art. In a typical arrangement, the multiple guitar pick cavities 16 are arranged around the circumference of the CD support surface elevation 15 in spaced-apart relationship to each other, with a wide end 16a of each guitar pick cavity 16 located adjacent to the outer edge of the CD support surface elevation 15 and a narrow end 16b of each guitar pick cavity 16 located adjacent to the center 15a of the CD support surface elevation 15. Accordingly, each of the guitar pick cavity 16 is sized and configured to receive a correspondingly-shaped guitar pick 30 (FIG. 7) typically in a snap-fit. The guitar picks 30 may have a conventional size and shape or may be any desired size and shape, in which case the guitar pick cavities 16 may be appropriately sized and configured to receive the guitar picks 30 typically in a snap-fit.

A top cover 20 is pivotally attached to the bottom cover 2 at the hinge 13. The top cover 20 typically includes a top cover panel 21. A side wall 22 extends upwardly from each side edge of the top cover panel 21, and the side walls 22 are spanned by a rear wall 23. Accordingly, the top cover 20 is capable of being pivoted on the hinge 13 from the closed position shown in FIG. 1, in which the tray 8 is seated in the bottom cover 2 and the top cover 20 covers the CD depression 10 in the upper surface 9 of the tray 8, and the opened position shown in FIGS. 3 and 4, in which the CD depression 10 is exposed. It will be understood that the positions of the CD depression 10 and the guitar pick cavities 16 in the tray 8 may be reversed, in which case the CD depression 10 may be provided in the lower surface 14 of the tray 8 and the guitar pick cavities 16 may be provided in the upper surface 9 of the tray 8.

Figure 6:
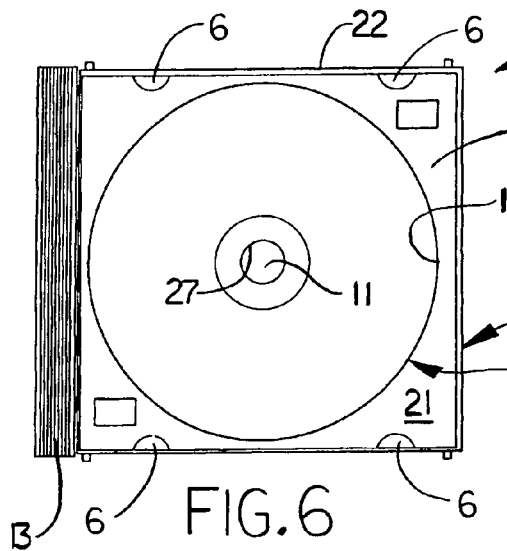
FIG. 6 is a top view of the closed CD case, with a compact disk inserted in the compact disk depression provided in the upper surface of the tray.
Figure 7:
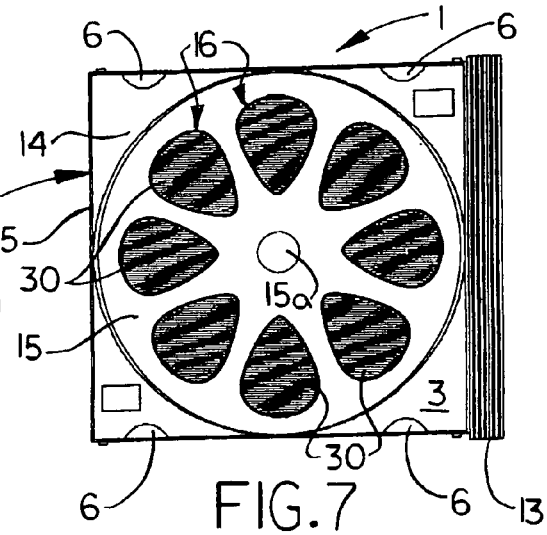
FIG. 7 is a bottom view of the closed CD case, with multiple guitar picks inserted in the respective guitar pick cavities provided in the lower surface of the tray.
Figure 8:
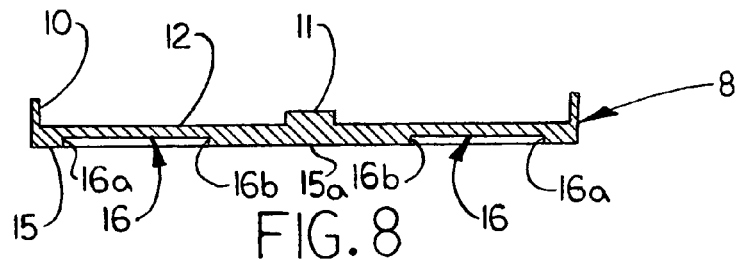
FIG. 8 is a cross-sectional view of the tray component of the CD case, taken along section lines 8-8 in FIG. 3.

Referring next to FIGS. 6 and 7 of the drawings, in typical use of the CD case with guitar picks 1, a compact disk 26 is inserted in the CD depression 10 in the upper surface 9 of the tray 8 as the CD attachment tab 11 is inserted through the central opening 27 of the compact disk 26, as illustrated in FIG. 6. The compact disk 26 may be that of a musical band, for example, or alternatively, may be a guitar methods training CD. Multiple guitar picks 30 are snap-fitted or inserted into the respective guitar pick cavities 16, with the wide end of each guitar pick 30 seated in the wide end 16a of the guitar pick cavity 16 and the narrow end of each guitar pick 30 seated in the narrow end 16b of the guitar pick cavity 16. The tray 8 is seated in the bottom cover 2 and the top cover 20 is closed over the tray 8. Accordingly, the compact disk 26 is visible through the transparent top cover panel 21 of the top cover 20, as illustrated in FIG. 6, whereas the guitar picks 30 are visible through the transparent bottom cover panel 3 of the bottom cover 2, as illustrated in FIG. 7. The compact disk 26 and guitar picks 30 can then be marketed in the CD case 1.

It will be appreciated by those skilled in the art that the visibility of the compact disk 26 and the guitar picks 30 in the CD case 1 allows the compact disk 26 to be marketed in a number of ways. For example, in cases in which the compact disk 26 is that of a musical band or a guitar methods training CD, the name of the band may be printed on each of the guitar picks 30 to attract potential buyers. Furthermore, in cases in which the compact disk 26 is a guitar teaching methods CD, the added bonus of the guitar picks 30 in the CD case 1 renders the compact disk 26 more attractive to potential customers. Moreover, the display characteristics of the CD case 1 facilitates entry of the CD case 1 into mass merchandising outlets and allows for easier placement of RFID (radio frequency identification) tags in or on the CD case 1.

A purchaser (not illustrated) of the CD case 1 accesses the compact disk 26 by pivoting the top cover 20 to the open position on the tray 8. The compact disk 26 is removed from the tray 8 by lifting the compact disk 26 from the CD depression 10, thereby removing the CD attachment tab 11 from the central opening 27 of the compact disk 26. The guitar picks 30 are accessed by pivoting the bottom cover 2 to the open position on the tray 8. The guitar picks 30 can be individually removed from the guitar pick cavities 16 by manually applying upward pressure to each guitar pick 30. In cases in which the compact disk 26 is that of a musical band or a guitar teaching methods CD, the compact disk 26 can be played as the purchaser or other user plays a guitar (not illustrated) using one of the guitar picks 30.

Figure 9:
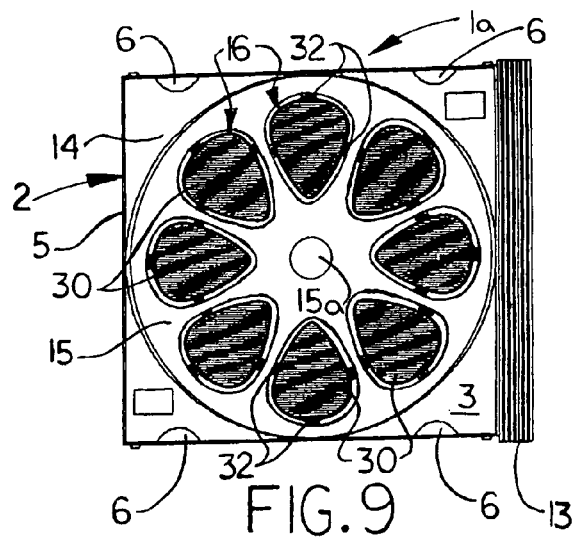
FIG. 9 is a bottom view of another embodiment of the CD case with guitar picks according to the present invention, illustrating multiple guitar picks detachably connected to respective guitar pick cavities through connecting tabs.

Referring next to FIG. 9 of the drawings, an alternative embodiment of the CD case with guitar picks according to the present invention is generally indicated by reference numeral 1a. The CD case 1a may have the same design as that of the CD case 1, except that in the CD case 1a, the guitar picks 30 are injection-molded in the respective guitar pick cavities 16. Each guitar pick 30 remains detachably connected to the edges of the corresponding guitar pick cavity 16 typically through multiple connecting tabs 32. The guitar picks 30 can be individually removed from the respective guitar pick cavities 16 by breaking the connecting tabs 32 which attach each guitar pick 30 to the guitar pick cavity 16 and removing the guitar pick 30 from the guitar pick cavity 16.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A CD case comprising:
   a first cover;
   a tray carried by said first cover and comprising:
      a first tray surface,
      a CD depression provided in said first tray surface;
      a CD attachment tab extending from said CD depression;
      a planar, continuous and uninterrupted CD support surface provided in said CD depression and said CD support surface provided around said CD attachment tab;
      a second tray surface opposite said first tray surface; and
      a CD support surface elevation provided on said second tray surface;
   at least one guitar pick cavity provided in said CD support surface elevation of said tray and visible through said first cover and sized and configured to receive and secure at least one guitar pick; and
   a second cover carried by said first cover.

2. The CD case of claim 1 wherein said at least one guitar pick cavity comprises a wide end and a narrow end tapering from said wide end.

3. The CD case of claim 1 wherein said at least one guitar pick cavity comprises a plurality of guitar pick cavities.

4. The CD case of claim 3 wherein said guitar pick cavities are arranged in a generally circular configuration in said tray.

5. The CD case of claim 1 wherein said tray is pivotally carried by said first cover.

6. A CD case comprising:
   a first cover;
   a tray carried by said first cover;
   at least one guitar pick detachably carried by said tray and visible through said first cover;
   a second cover carried by said first cover;
   a compact disk detachably carried by said tray and visible through said second cover;
   at least one guitar pick cavity provided in said tray and wherein said at least one guitar pick is contained in said at least one guitar pick cavity; and
   at least one connecting tab connecting said at least one guitar pick to said at least one guitar pick cavity.

7. The CD case of claim 6 wherein said at least one guitar pick comprises a plurality of guitar picks.

8. The CD case of claim 7 wherein said guitar picks are arranged in a generally circular configuration on said tray.

9. The CD case of claim 6 further comprising a CD depression having a CD support surface provided in said tray and wherein said compact disk is seated in said CD depression.

10. The CD case of claim 9 further comprising a CD attachment tab extending from said CD support surface.

11. The CD case of claim 9 wherein said tray has opposite first and second surfaces and said CD depression is provided in said first surface and said at least one guitar pick is provided in said second surface of said tray.

12. A method of packaging a compact disk, comprising:
   providing a CD case having a first cover and a tray and a second cover carried by said first cover;
   providing a compact disk and at least one guitar pick on said tray;
   displaying said compact disk and said at least one guitar pick through said CD case; and
   wherein said providing at least one guitar pick on said tray comprises providing at least one guitar pick cavity in said tray and detachably connecting said at least one guitar pick to said at least one guitar pick cavity.

13. The method of claim 12 wherein said detachably connecting said at least one guitar pick to said at least one guitar pick cavity comprises snap-fitting said at least one guitar pick in said at least one guitar pick cavity.

14. The method of claim 12 wherein said providing at least one guitar pick on said tray comprises providing a plurality of guitar picks on said tray in a generally circular arrangement.

\* \* \* \* \*